US008942903B2

(12) United States Patent
Friesen et al.

(10) Patent No.: US 8,942,903 B2
(45) Date of Patent: Jan. 27, 2015

(54) METHOD FOR PREDICTING THE TEMPERATURE OF A WHEEL BEARING OF A WHEEL OF A VEHICLE

(75) Inventors: Ulf Friesen, Neubiberg (DE); Ralf Furtwängler, Munich (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 413 days.

(21) Appl. No.: 13/394,692

(22) PCT Filed: Sep. 9, 2010

(86) PCT No.: PCT/EP2010/063205
§ 371 (c)(1),
(2), (4) Date: Apr. 18, 2012

(87) PCT Pub. No.: WO2011/029858
PCT Pub. Date: Mar. 17, 2011

(65) Prior Publication Data
US 2012/0197505 A1  Aug. 2, 2012

(30) Foreign Application Priority Data

Sep. 9, 2009  (DE) .......................... 10 2009 040 801

(51) Int. Cl.
*B61K 9/04* (2006.01)
*B61L 15/00* (2006.01)
*B60T 7/12* (2006.01)

(52) U.S. Cl.
CPC .............. *B61K 9/04* (2013.01); *B61L 15/0081* (2013.01); *B60T 7/126* (2013.01); *B60L 2200/26* (2013.01)
USPC .......... 701/70; 701/29.1; 701/29.2; 701/31.9; 701/32.1; 701/32.9

(58) Field of Classification Search
CPC .............. B61K 9/00; B61K 9/04; B61K 9/06; B60T 7/12; B60T 7/126
USPC ................ 701/29.1, 29.2, 31.9, 32.1, 32.9, 70
See application file for complete search history.

(56) References Cited

U.S. PATENT DOCUMENTS 4,316,175 A * 2/1982 Korber et al. ............. 246/169 A
5,381,692 A * 1/1995 Winslow et al. ................ 73/593
(Continued)

FOREIGN PATENT DOCUMENTS

EP  0276201 A2  7/1988
EP  1197416 A2  4/2002
(Continued)

OTHER PUBLICATIONS

Notification of Transmittal of International Preliminary Report on Patentability for International Application No. PCT/EP2010/063205 and Written Opinion.
(Continued)

*Primary Examiner* — John Q Nguyen
*Assistant Examiner* — Michael Whalen
(74) *Attorney, Agent, or Firm* — Barnes & Thornburg LLP (57) ABSTRACT

A method for predicting the temperature ($T_{in,p}$) of a wheel bearing of a vehicle wheel for a future moment ($t+\Delta t_p$) in relation to a present moment (t) or for a future time interval (t, $t+\Delta t_p$) in relation to a present moment (t), on the basis of a course of the temperature ($T_{in}$) of the wheel bearing in a past time interval ($t-\Delta t_b$, t) in relation to the present moment (t), the predicted temperature ($T_{in,p}$) of the wheel bearing being determined from the sum of the temperature ($T_{in}$) of the wheel bearing at the present moment (t) and a corrective value ($\Delta T_P$) which is determined according to a change in at least one driving condition, such as the speed ($\Delta v_{train}$), and a change in the temperature ($\Delta T_b$) of the wheel bearing within the past time interval ($t-\Delta t_b$, t).

10 Claims, 4 Drawing Sheets

(56) References Cited

U.S. PATENT DOCUMENTS

| | | | |
|---|---|---|---|
| 6,299,263 B1 * | 10/2001 | Uematsu et al. | 303/192 |
| 7,111,507 B2 * | 9/2006 | Fennel et al. | 73/146.4 |
| 7,260,446 B2 * | 8/2007 | Besuchet | 700/176 |
| 2002/0129633 A1 * | 9/2002 | Joki et al. | 72/13.4 |
| 2003/0187605 A1 | 10/2003 | Mathews, Jr. et al. | |
| 2009/0061657 A1 * | 3/2009 | Klinger et al. | 439/77 |
| 2011/0112806 A1 * | 5/2011 | Kisor et al. | 703/2 |
| 2012/0185180 A1 * | 7/2012 | Frederiksen | 702/35 |
| 2012/0193484 A1 * | 8/2012 | Furtwangler et al. | 246/169 A |

FOREIGN PATENT DOCUMENTS

| | | | |
|---|---|---|---|
| EP | 1365163 A1 | 11/2003 | |
| WO | 9711871 A1 | 4/1997 | |
| WO | WO 2011029858 A1 * | 3/2011 | |
| WO | WO 2011029859 A1 * | 3/2011 | |

OTHER PUBLICATIONS

English Translation of the International Preliminary Report on Patentability for International Application No. No. PCT/EP2010/063205 and Written Opinion.

Search Report for International Patent Application No. PCT/EP2010/063205; Feb. 4, 2011.

* cited by examiner

METHOD FOR PREDICTING THE TEMPERATURE OF A WHEEL BEARING OF A WHEEL OF A VEHICLE

PRIORITY CLAIM

This patent application is a U.S. National Phase of International Patent Application No. PCT/EP2010/063205, filed 9 Sep. 2010, which claims priority to German Patent Application No. 10 2009 040 801.0, filed 9 Sep. 2009, the disclosures of which are incorporated herein by reference in their entirety.

BACKGROUND

Disclosed embodiments relate to a method for predicting the temperature of a wheel bearing of a wheel of a vehicle, to a device for carrying out the method and to the use of the predicted temperature.

Nowadays, diagnostic and monitoring systems are being increasingly used in rail vehicle traffic, the diagnostic and monitoring systems detecting changes in state of components and assemblies of the rail vehicle in order to detect defects in these components and assemblies. In particular in the case of a wheel set of a rail vehicle the detection of damage is of particular interest in terms of hot running.

Modern high speed trains travel across borders and must therefore meet corresponding criteria in order to ensure interoperability, for example the 96/48/EG guideline. The guideline requires, inter alia, onboard monitoring of the wheel set bearings of the wheel sets of the rail vehicle. In order to reveal critical operating states such as, for example, hot running of a wheel set bearing, in particular monitoring of the temperature of the wheel set bearings is necessary.

EP 1 365 163 A1 discloses a device for monitoring the temperature of a wheel set bearing of a wheel set of a rail vehicle in which a sensor element is arranged directly on a sealing element of the wheel set bearing, i.e. as close as possible to the load zone of the wheel set bearing. However, mounting of a temperature sensor directly on the load zone of a wheel set bearing on which the maximum temperatures have been empirically found to occur, i.e. at the top when viewed in the circumferential direction of the outer bearing ring, requires a certain amount of expenditure on mechanically connecting the temperature sensor and on its cabling and is often structurally difficult to implement for reasons of space, in particular if multiple load zones have to be taken into account within a bearing unit, for example in the case of double bearings. As a rule it is therefore difficult to measure the temperature in the load zone of the wheel bearing. However, if the temperature profile is measured at measuring points which differ from or are remote from the load zone, for example at a bearing cover of the wheel bearing, these signals have time delays owing to the thermal junction between the load zone and the measuring point, which time delays also delay a diagnostics or interpretation of the measured temperature.

If, for example, a rail vehicle has a speed of 300 km/h and the critical temperature of a wheel bearing is 110° C. and this temperature is reached with a high temperature gradient, in the case of temperature monitoring of the prior art automatic braking is initiated when the critical temperature is reached. However, the temperature of the respective wheel bearing will still rise significantly for a specific time, i.e. the bearing temperature can exceed the critical temperature, with the threat of damage to the bearings.

SUMMARY

Therefore, it would be desirable to have a method for predicting the bearing temperature of a wheel bearing would enable taking suitable measures before the critical temperature.

Thus, disclosed embodiments provide a method which permits the most reliable for the prediction of the temperature of a wheel bearing of a wheel of a vehicle with low technical signal-processing expenditure.

BRIEF DESCRIPTION OF THE FIGURES

Disclosed embodiments are presented in more detail below together with the description of disclosed embodiments with reference to the figures. In the drawing.

DETAILED DESCRIPTION

The prediction of the temperature of a wheel bearing of a wheel of a vehicle which is carried out according to the inventive method for a future time in relation to a present time or for a future time interval in relation to a present time takes place on the basis of a profile of the temperature of the wheel bearing in a past time interval in relation to the present time.

In this context, the predicted temperature of the wheel bearing is obtained from the sum of the temperature of the wheel bearing at the present time and a correction value which is determined as a function of a change in at least one driving state condition such as the velocity and of a change in the temperature of the wheel bearing within the past time interval.

In other words, the method is based on the past profile of a wheel bearing temperature which is indirectly or directly measured or estimated. A correction value which is calculated by the method on the basis of the history is then weighted as a function of at least one driving state condition and added to the currently measured temperature. The result constitutes a prediction of the wheel bearing temperature which will occur after a specific time period. In this context, a change in the input of heat into the wheel bearing due to a change in the driving state conditions such as the vehicle speed or changes in combinations of a plurality of driving state conditions are implicitly taken into account.

The method can compensate the delays which are present in the prior art and which occur until a diagnostic result is provided, in order to assume a safe state and in order to prevent damage. Because of the prediction of the bearing temperature, the proposed method can be used to trigger an alarm signal at such an early time that the measured bearing temperature has not yet even reached the critical temperature but is expected to do so on the basis of the prediction. The further rise in the bearing temperature after the initiation of counter-measures such as, for example, automatic braking is then uncritical because the critical bearing temperature has not even been reached beforehand.

The method according to disclosed embodiments may therefore be particularly suitable for vehicles in which it is particularly desirable to monitor the wheel bearings for safety reasons, that is to say for rail vehicles, and among those in particular for high speed trains. However, the method can be applied to any type of vehicle.

The correction value may be calculated from the product of a factor which represents the change in the at least one driving state condition within the past time interval and the change in the temperature of the wheel bearing within the past time interval, wherein the factor
  a) is equal to a predefined value (for example 1) if the change in the at least one driving state condition within the past time interval is equal to zero,
  b) is less than the predefined value (for example 1) if the change in the at least one driving state condition within the past time interval is positive, and
  c) is greater than the predefined value (for example 1) if the change in the at least one driving state condition within the past time interval is negative.

In the case a), a rise in the bearing temperature is predicted by extrapolation on the basis of the chronologically past profile of the bearing temperatures if the at least one driving state condition, such as the vehicle speed, remains unchanged during the past time interval.

If, on the other hand, the vehicle speed was reduced during the past time interval according to case b), this influence is taken into account by means of a factor of less than the predefined value in order to obtain a value for the predicted bearing temperature which is lower in comparison. This is intended to prevent a rise in the bearing temperature which has taken place in the past also being extrapolated according to a braking process because the input of heat into the wheel bearing is reduced by the braking operation.

However, if according to case c) the vehicle speed was increased within the past time interval, it is to be expected that the input of heat into the wheel bearing increases further, with the result that a factor is set to be greater than the predefined value in order to be able to allow for this influence.

It may be provided that
  a) if the temperature at the present time or the predicted temperature of the wheel bearing exceeds a predefined temperature threshold for at least one predefined time interval, a warning signal is generated, and
  b) if the predicted temperature of the wheel bearing exceeds a predefined temperature threshold for at least one predefined time interval, an alarm signal is generated.

The warning signal or alarm signal is then generated as a function of threshold values being reached by the currently present (and measured or estimated) temperature or by the predicted temperature of the wheel bearing. A warning signal constitutes here, in terms of the urgency of an intervention such as, for example, automatic braking of the vehicle, a secondary signal compared to the prioritized alarm signal which requires immediate intervention.

A diagnostic behavior which is adapted to the respective driving conditions or operating conditions is obtained through the use of different temperatures, specifically, on the one hand, the currently present bearing temperature, and, on the other hand, the predicted bearing temperature. This is because when a large temperature gradient is detected within the past time interval, a warning signal becomes due, since then a state which is critical for the respective wheel bearing can be reached very quickly, with the result that in this case an alarm signal which brings about an intervention may be preferrable over a warning signal. In the case of moderate temperature gradients within the past time interval, under certain circumstances, an alarm signal which is still to be generated is preceded by a warning signal to which there can be a suitable reaction, for example through a reduction in the vehicle speed.

As a result, a situation-appropriate signaling characteristic is obtained because depending on the respective situation the alarm signal can be preceded by a warning signal, for example when the rise in temperature during the past time interval was moderate. Otherwise, that is to say in the case of large temperature gradients during the past time interval, an alarm signal is generated and a warning signal is then due. In the first case, an alarm signal can then be prevented by interventions such as a reduction in the speed on the basis of the warning signal, but generally not in the second case.

This configuration of the method according to the various disclosed embodiments permits early detection of critical states of the bearing in which the profile of the temperature and further system states which have an influence on the input of heat into the bearing are taken into account. The predictive character compensates the time delays when a safe state is entered, i.e. in an ideal case the temperature will not exceed the critical temperature after the reaction to the alarm either. The alarm threshold can therefore be made to approach the critical temperature more closely than in the prior art.

In order to avoid obtaining unrealistic values for the correction value or the factor, the factor is limited, for example, within to a predefined interval and the correction value is limited to a maximum value. The interval for the factor or the maximum value for the correction factor is obtained, for example, from trials.

Furthermore, the temperature of the wheel bearing at the present time may be determined based on the temperature measured at a component which is different from the wheel bearing but has a thermally conductive direct or indirect connection to the wheel bearing, wherein a wheel set bearing cover which at least partially covers the wheel bearing or the wheel set bearing housing of the wheel set bearing is used as the component which is different from the wheel set bearing.

This measure allows for the fact mentioned at the beginning that it is generally difficult to mount temperature sensors in the load zone of a wheel bearing is generally difficult. Since the method according to disclosed embodiments can largely compensate the disadvantages, brought about by the (indirect) measurement of the wheel bearing temperature at other points, in terms of the time delay of the response to a change in the operating conditions as a result of the chronological prediction of the bearing temperature, the indirect measurement of the wheel bearing temperature, which is more favorable compared with the expenditure, no longer constitutes a disadvantage.

Disclosed embodiments also relate to a use of the temperature of the wheel bearing predicted on the basis of the method according to one of the for comparison with a temperature limiting value, a predicted temperature of the wheel bearing which exceeds the temperature limiting value supplies a signal for an applied state of at least one friction brake which is assigned to or adjacent to the wheel bearing and a predicted temperature of the wheel bearing which undershoots the temperature limiting value supplies a signal for a released state of the friction brake which is assigned to or adjacent to the wheel bearing.

Therefore, the functions (applied or released) of friction brakes of the rail vehicle which are adjacent to the wheel set bearing 1 can also be monitored using the temperature $T_{in,p}$ of the wheel set bearing 1 which is predicted on the basis of the method according to Disclosed embodiments.

Disclosed embodiments also relates to a device for carrying out the method described above, wherein a temperature sensor for directly or indirectly measuring the temperature of the wheel bearing and a microcomputer, in which a computing model for predicting the temperature of the wheel bearing is implemented, are provided.

In this context, the temperature sensor may be combined with a speed sensor to form a combination sensor. No additional expenditure is then occurred for the temperature sensor as a result of the sensor installation and cabling. Such combination sensors are used, in particular, in anti-skidding devices of rail vehicles.

Figure 1:
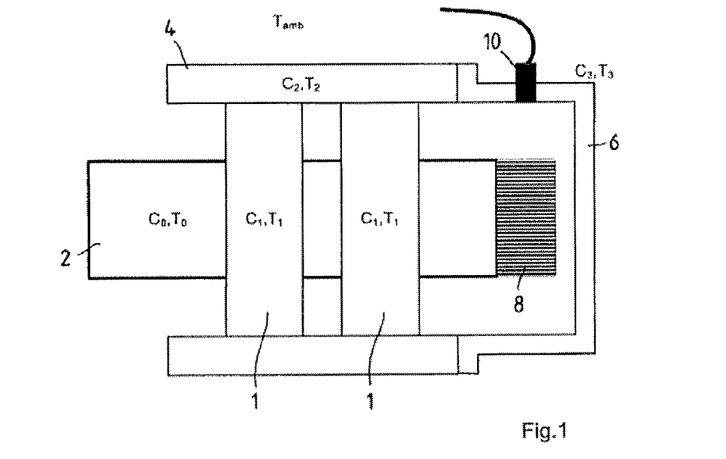
FIG. 1 is a schematic illustration of a wheel set bearing of a rail vehicle having a temperature sensor.

FIG. 1 is a schematic illustration of a wheel set bearing 1 of a rail vehicle, wherein two wheels (not shown here explicitly) are arranged at the ends of a shaft or axle 2 of the wheel set. In this context, a wheel set bearing 1 is present in the vicinity of each of the wheels, which wheel set bearing 1 supports the axle 2 on a bogie (not shown here either). The wheel set bearing 1 may be a double bearing, i.e. two wheel set bearings, for example in the form of two roller bearings, which are arranged one behind the other in the axial direction are present.

The following statements relate to a method and a device for estimating the temperature of the wheel set bearing 1 by means of a computing model. The computing model for estimating the temperature of the wheel set bearing 1 is based on modeling the thermal capacitances of components of the wheel set or of the wheel set bearing 1, the thermal conduction in components of the wheel set or of the wheel set bearing 1, the transfer of heat resistances between components of the wheel set or wheel set bearing 1 and the forced convection, forced as a result of the velocity of the rail vehicle, of the free convection and of the transfer of heat between the components of the wheel set or wheel set bearing 1 into the surroundings. The forced convection is a function of the speed of the rail vehicle.

Figure 2:
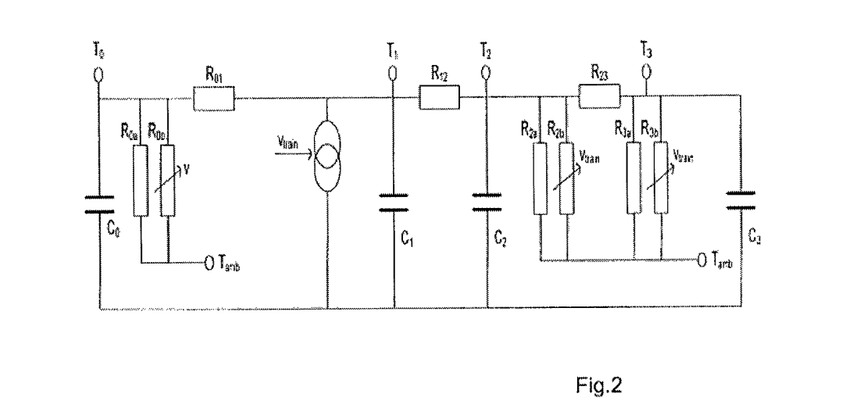
FIG. 2 is a schematic equivalent circuit diagram of a computing model within the scope of a method for estimating the wheel set bearing temperature of the wheel set bearing in FIG. 1 and the ambient temperature of the rail vehicle.

An electrical equivalent circuit diagram of the computing model is shown in FIG. 2 and has the following elements:

The axle 2 has a thermal capacitance $C_0$, wherein conduction of heat, symbolized by the resistance $R_{01}$ from the axle to the wheel set bearing 1 takes place with the thermal capacitance $C_1$, or vice-versa. This is because the internal rings of the wheel set bearings 1 which may be embodied as roller bearings have a directly thermally conductive connection to the axle 2. Both the wheel set bearings 1 which are combined to form a double bearing have, in a simplifying fashion, the thermal capacitance $C1$. Furthermore, the free and forced convection, i.e. the transfer of heat from the axle 2 to the surroundings is symbolized by the resistances $R_{0a}$ and $R_{0b}$. The forced convection occurs owing to the velocity $v_{train}$ of the rail vehicle. It is assumed that the axle 2 has a temperature $T_0$.

Heat is conducted from the wheel set bearings 1 with the thermal capacitance $C1$ to a common wheel set bearing housing 4 of the wheel set bearings 1, which wheel set bearing housing 4 has the thermal capacitance $C_2$, and to the axle 2 with the thermal capacitance $C_0$ via the resistance $R_{01}$. Furthermore, an input of heat which is dependent on the speed $v_{train}$ of the rail vehicle into the wheel set bearings 1 takes place. It is assumed that the wheel set bearings 1 have a temperature $T_1$.

The conduction of heat from the wheel set bearing housing 4 of the wheel set bearings 1 with the thermal capacitance $C_2$ to the wheel set bearings 1 ($C_1$) is symbolized by the resistance $R_{12}$, and the conduction of heat to a wheel set bearing cover 6 with the thermal capacitance $C_3$ is symbolized by the resistance $R_{23}$. The resistances $R_{2a}$ and $R_{2b}$ characterize the free and forced convection and therefore the transfer of heat from the wheel set bearing housing 4 into the surroundings, or vice-versa. It is assumed that the wheel set bearing housing 4 has the temperature $T_2$.

The free and forced convection acting on the wheel set bearing cover 6 and therefore the transfer of heat from the convection into the surroundings is symbolized by the resistances $R_{3a}$ and $R_{3b}$.

The wheel set bearing housing 4 has a direct thermally conductive connection here to the outer bearing rings of the wheel set bearings 1 which may be embodied as roller bearings, as they also do at the ends to the wheel set bearing cover 6. The conduction of heat between the wheel set bearing housing 4 and the wheel set bearing cover 6 occurs via the resistance $R_{23}$. The transfer of heat between the surroundings with the ambient temperature $T_{amb}$ and the wheel set bearing cover 6 by free convection and forced convection owing to the velocity $v_{train}$ is characterized by the transfer of heat resistances $R_{3a}$ and $R_{3b}$.

The wheel set bearing cover 6 surrounds the end of the axle 2 which protrudes axially beyond the wheel set bearings 1 to some extent and on which end a pole wheel 8 of a speed sensor (otherwise not shown here) is formed. The speed sensor sends a speed signal to an anti-skidding device of the rail vehicle in order to be able to carry out slip-controlled braking operations.

Instead of measuring the temperature $T_1$ of the wheel set bearing 1 directly, the temperature $T_3$ of the wheel set bearing cover 6 is measured by a temperature sensor 10. Furthermore, a sensor (not shown here) is also provided for the direct or indirect measurement of the velocity $v_{train}$ of the rail vehicle and initially also a sensor (not shown here) for measuring the ambient temperature $T_{amb}$.

Figure 3:
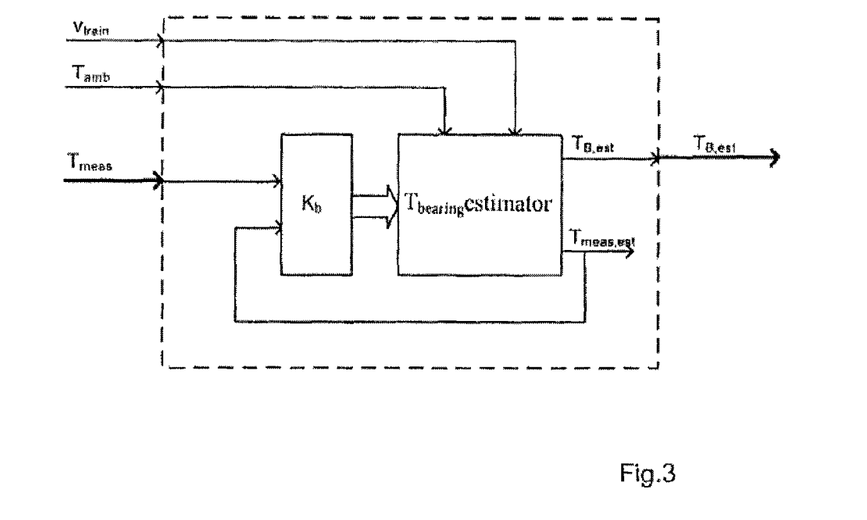
FIG. 3 is a block circuit diagram illustrating a method for estimating the wheel set bearing temperature of the wheel set bearing in FIG. 1.

In the case of the embodiment of the computing model $T_{bearing}$ estimator which is shown as a block circuit diagram in FIG. 3, the temperature $T_3$ of the wheel set bearing cover 6 which is measured by the temperature sensor 8 is denoted as $T_{meas}$. Furthermore, in FIG. 3, the temperature $T_1$ of the wheel set bearings 1, to be estimated by the computing model $T_{bearing}$ estimator, is denoted by $T_{B,est}$. On the other hand, the designation of the ambient temperature $T_{amb}$ and that of the speed $v_{train}$ of the rail vehicle remain unchanged.

The computing model $T_{bearing}$ estimator is then capable, by virtue of its design illustrated in FIG. 2, of estimating the temperature $T_{B,est}$ of the wheel set bearings 1 as input variables as a function of the speed $v_{train}$ and of the ambient temperature $T_{amb}$ of the rail vehicle.

In addition, the temperature $T_{meas}$ of the wheel set bearing 6, which has a thermally conductive connection to the wheel set bearing housing 4 and the wheel set bearings 1, is measured by the temperature sensor 10 as a measured temperature during operation. In parallel with this, the temperature of the wheel set bearing cover 6 is also estimated as an estimated temperature $T_{meas,est}$ using the computing model $T_{bearing}$ estimator.

In order to improve the accuracy of the computing model $T_{bearing}$ estimator with respect to the estimation of the temperature $T_{B,est}$ of the wheel set bearings 1, the computing model $T_{bearing}$ estimator has a correction element $K_b$ with which it is continuously, temporarily or cyclically calibrated or adjusted on the basis of a comparison of the measured temperature $T_{meas}$ of the wheel set bearing cover 6 with the estimated temperature $T_{meas,est}$ of the wheel set bearing cover 6.

In other words, auto-calibration or auto-adjustment of the computing model $T_{bearing}$ estimator, whose objective is to estimate the temperature $T_{B,est}$ of the wheel set bearings 1, is carried out by measuring and estimating the temperature at a location on the wheel set which is different from the wheel set bearings 1 but which is thermodynamically connected to the wheel set bearings 1 through the conduction of heat or the transfer of heat. This location may be the wheel set bearing cover 6 because at the wheel set bearing cover 6 a temperature sensor 10 can be more easily mounted, for reasons of space, than on the wheel set bearings 1 themselves. On the other hand, the speed sensor which interacts with the pole wheel 8 for the prevention of skidding is arranged on the wheel set bearing cover 6, with the result that the temperature sensor 10 can be advantageously combined with the speed sensor to form a combination sensor 10.

Furthermore, in the computing model $T_{bearing}$ estimator, basic calibration or basic parameterization is carried out, and taking this as a basis the correction element $K_b$ or the correction term $K_b$ is adapted in order to improve the accuracy of the computing model $T_{bearing}$ estimator during operation of the rail vehicle. The input calibration or basic calibration of the computing model $T_{bearing}$ estimator is derived, for example, from the vehicle parameters, determined using simulations (for example finite elements) or can be carried out on the basis of measured data.

The result of the estimation is then the temperature $T_{B,est}$ of the wheel set bearings 1, and the result constitutes the temperature of the wheel set bearing 1 at the current or present time t. This temperature can, of course, also be measured directly at the wheel set bearing 1 by means of a suitable sensor system.

Figure 4:
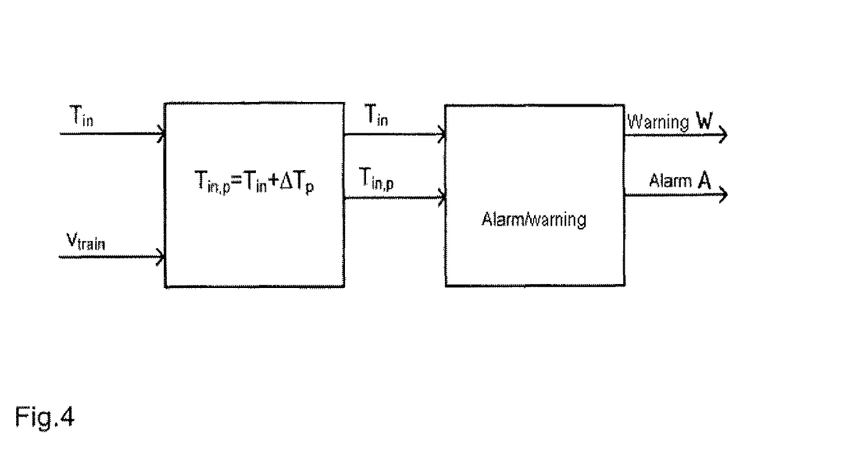
FIG. 4 is a block circuit diagram illustrating a method for predicting the wheel set bearing temperature of the wheel set bearing in FIG. 1.

For the following statements, which relate to a method and a device for predicting the temperature of the wheel set bearing 1, the temperature which is predicted for a future time $(t+\Delta t_p)$ in relation to a present time (t) or for a future time interval $(t, t+\Delta t_p)$ in relation to a present time (t) is denoted by $T_{in,p}$ and the temperature $T_{B,est}$ of the wheel set bearing 1 which is measured, or as described above, estimated in relation to the present time (t) is denoted by $T_{in}$.

The prediction of the temperature of the wheel bearing 1 is made on the basis of a profile of the temperature $T_{in}$ of the wheel bearing 1 in a past time interval $[t-\Delta t_b, t]$ in relation to the present time (t), wherein the predicted temperature $T_{in,p}$ of the wheel bearing 1 is obtained from the sum of the temperature $T_{in}$ (at top: $T_{B,est}$) of the wheel bearing 1 at the present time (t) and a correction value $\Delta T_p$ which is determined as a function of a change in at least one driving state condition such as the velocity $\Delta v_{train}$ and of a change in the temperature $\Delta T_{in}$ of the wheel set bearing within the past time interval $[t-\Delta t_b, t]$:

$$T_{in,p} = T_{in} + \Delta T_p \quad (1)$$

is the temperature predicted for the time $(t+\Delta t_p)$ on the basis of the temperature $T_{in}$ which is estimated or measured at the time (t).

In order to determine the correction value $\Delta T_p$, the rise $\Delta T_b$ of the temperature $T_{in}$ of the wheel set bearing 1 in the past time interval $[t-\Delta t_b, t]$ is firstly obtained.

In a special case, $\Delta t_b = \Delta t_p$. The following then applies:

$$\Delta T_p = c \Delta T_b \quad (2)$$

wherein the correction value $\Delta T_p$ may be limited to an interval $[0, \Delta T_{max}]$.

The correction value $\Delta T_p$ may therefore be computed from the product of a factor c which represents the change in, for example, the velocity $v_{train}$ within the past time interval $[t-\Delta t_b, t]$ and the change $\Delta T_b$ in the temperature of the wheel set bearing 1 within the past time interval $[t-\Delta t_b, t]$.

The factor c is obtained from the speeds at the interval boundaries of $[t-\Delta t_b, t]$ where $v_{train}(t-\Delta t_b) = v_{train,b}$ and $v_{train}(t) = v_{train}$. If the speed $v_{train}$ has changed (for example $v_{train} < v_{train,b}$), the following then applies:

$$c = v_{train} / v_{train,b} \quad (3)$$

The factor c may be limited to an interval $[c_{min}, c_{max}]$.

The factor c is here
equal to 1 if the change in the vehicle speed $v_{train}$ within the past time interval $[t-\Delta t_b, t]$ is equal to zero,
is less than 1 if the change in the vehicle speed $v_{train}$ within the past time interval $[t-\Delta t_b, t]$ is positive, is greater than 1 if the change in the vehicle speed $v_{train}$ within the past time interval $[t-\Delta t_b, t]$ is negative.

In the case of c=1, a rise in the wheel set bearing temperature $T_{in,p}(t)$ is then predicted by extrapolation on the basis of the chronologically preceding profile of the measured or estimated wheel set bearing temperatures $T_{in}(t)$ if the vehicle speed $v_{train}$ remained unchanged during the past time interval $[t-\Delta t_b, t]$.

Figure 5:
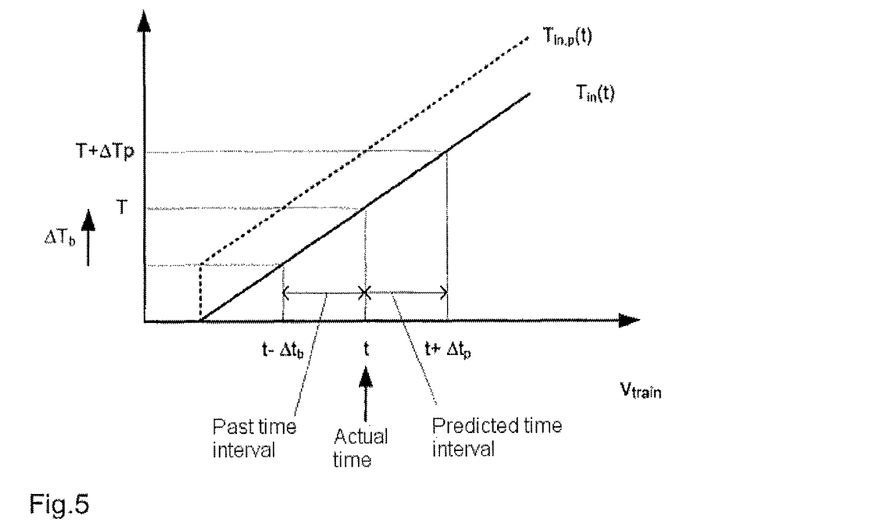
FIG. 5 shows a diagram which illustrates the dependence of the wheel set bearing temperature on the velocity.

This situation is illustrated in FIG. 5, in particular the special case in which $\Delta t_b = \Delta t_p$.

If, on the other hand, the vehicle speed $v_{train}$ was reduced during the past time interval $(t-\Delta t_b, t]$, this influence is taken into account by means of a factor c of less than 1 in order to obtain a, by comparison, smaller value for the predicted wheel set bearing temperature $T_{in,p}(t)$. This is intended to prevent a rise in the wheel set bearing temperature which has taken place in the past from also being extrapolated after a braking process because the input of heat into the wheel set bearing 1 is reduced by the braking operation.

Figure 6:
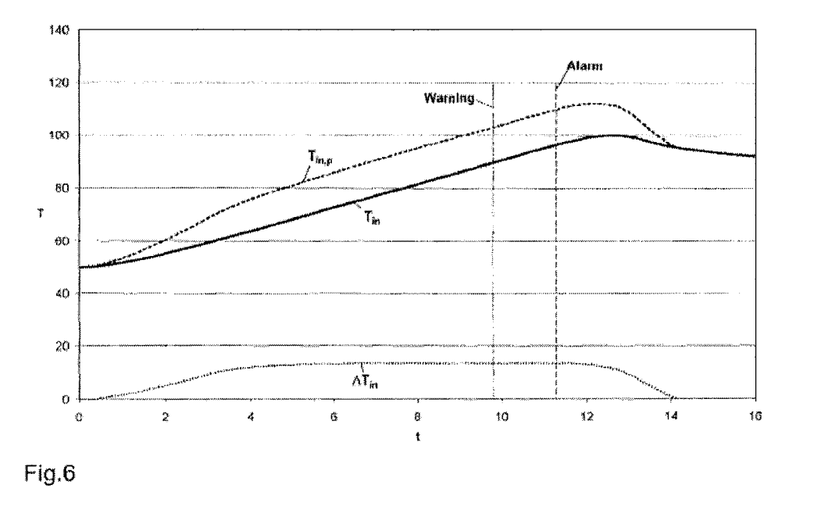
FIG. 6 shows a diagram illustrating the temperature predicted with the method in the case of small past temperature gradients.

This situation is shown by the diagram in FIG. 6 which illustrates the dependence of the measured or estimated wheel set bearing temperatures $T_{in}$ (continuous line) and of the wheel set bearing temperature $T_{in,p}$ (dashed line) on the vehicle speed $v_{train}$. There, a reduction in the velocity $v_{train}$ took place in the past time interval $[t-\Delta t_b, t]$, with the result that the temperature gradient $\Delta T_b$ is relatively small there.

However, if, according to case c), the vehicle speed $v_{train}$ was increased within the past time interval $[t-\Delta t_b, t]$, it is to be expected that the input of heat into the wheel set bearing 1 increases further, with the result that a factor c is set to be greater than 1 in order to allow for this influence.

Figure 7:
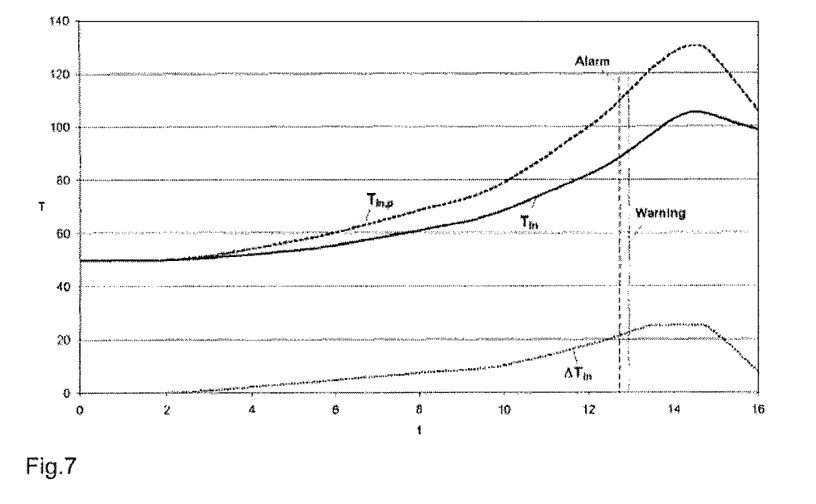
FIG. 7 shows a diagram illustrating the temperature predicted with the method in the case of large past temperature gradients.

This situation is shown by the diagram in FIG. 7 which illustrates the dependence of the measured or estimated wheel set bearing temperatures $T_{in}$ (continuous line) and of the wheel set bearing temperature $T_{in,p}$ (dashed line) on the vehicle speed $v_{train}$. There, an increase in the velocity $v_{train}$ took place in the past time interval $[t-\Delta t_b, t]$, with the result that the temperature gradient $\Delta T_b$ is relatively large there.

There also may be provision that
if the temperature $T_{in}$ at the present time or the predicted temperature $T_{in,p}$ of the wheel set bearing 1 exceeds a predefined temperature threshold $T_w$ for at least one predefined time interval $\Delta t_w$, a warning signal W is generated, and
if the predicted temperature $T_{in,p}$ of the wheel set bearing 1 exceeds a predefined temperature threshold $T_A$ for at least one predefined time interval $\Delta t_A$, an alarm signal A is generated.

A warning signal W constitutes here, in terms of the urgency of an intervention such as, for example, automatic braking of the rail vehicle or rail vehicle train, a secondary signal compared to the prioritized alarm signal A which brings about such immediate intervention.

If, with respect to FIG. 6 and FIG. 7, for example the critical temperature of the wheel set bearing 1 is 120° C., the threshold value $T_A$ for the generation of the alarm signal A in the prior art (alarm conventional) would be defined, for example, at 100° C. in order to have a sufficient safety interval available. The threshold value $T_W$ for the generation of a warning signal W is, for example, 90° C.

On the other hand, the threshold value $T_A$ for the generation of the alarm signal A for the method according to Disclosed embodiments for predicting the wheel set bearing temperature $T_{in,p}$ may be closer to the critical temperature (120° C.) and is, for example, 110° C.

In the example in FIG. 7, the measured or estimated temperature $T_{in}$ when an alarm signal A is triggered is, for example, 85° C., i.e. even though the threshold value $T_A$ for the generation of an alarm signal is 10° C. higher than in the prior art, the triggering of the alarm signal A already occurs at a temperature which is 15° C. lower. It is therefore possible, given a suitable reaction to the alarm signal A, to prevent the critical temperature (120° C.) of the wheel set bearing 1 from being reached at all.

When a large temperature gradient $\Delta T_b$ of the temperature of the wheel set bearing 1 is detected within the past time interval $[t-\Delta t_b, t]$, as is the case in FIG. 7, a warning signal W becomes due and/or if it was not generated chronologically until after the alarm signal A since a state which is critical for the respective wheel set bearing 1 would then be reached very quickly, an alarm signal A which may bring about an intervention may then be preferable to a warning signal W in this case.

However, given moderate temperature gradients $\Delta T_b$ of the temperature of the wheel set bearing 1 within the past time interval $[t-\Delta t_b, t]$, as is the case in FIG. 6, under certain circumstances an alarm signal A which is still to be generated is preceded by a warning signal W to which there can be a suitable reaction, for example a reduction in the vehicle speed $v_{train}$.

The temperature $T_{in,p}$ of the wheel set bearing 1 which is predicted by the method according to disclosed embodiments may also be used for comparison with a temperature limiting value in order to be able to assess whether a brake device, in particular a disk brake (not shown here) which is assigned to or adjacent to the wheel set bearing 1 is in a released or applied state.

A predicted temperature $T_{in,p}$ of the wheel set bearing 1 which exceeds the temperature limiting value then supplies a signal for an applied state of the friction brake which is assigned to or adjacent to the wheel set bearing 1 and an estimated predicted temperature $T_{in,p}$ of the wheel set bearing 1 which undershoots the temperature limiting value supplies a signal for a released state of the friction brake which is assigned to or adjacent to the wheel set bearing 1.

Disclosed embodiments is based on the fact that when a friction brake is applied, friction heat is produced. This friction heat is then transmitted by transfer of heat, conduction of heat along the axle 2 and/or convection to the adjacent wheel set bearing 1.

A relatively low predicted temperature $T_{in,p}$ of the wheel set bearing 1 then not only indicates normal running of the wheel set bearing 1 but also a released state of the adjacent friction brake. In contrast, a relatively high the predicted temperature $T_{in,p}$ of the wheel set bearing 1 provides an indication of a wheel set bearing 1 which has run hot and/or of an applied state of the friction brake which is adjacent to the respective wheel set bearing 1.

LIST OF DESIGNATIONS

1 Wheel set bearing
2 Axle
4 Wheel set bearing housing
6 Wheel set bearing cover
8 Pole wheel
10 Temperature sensor

The invention claimed is:

1. A method of using a temperature ($T_{in,p}$) of a wheel bearing, the temperature being predicted the for a future time ($t+\Delta t_p$) in relation to a present time (t) or for a future time interval (t, $t+\Delta t_p$) in relation to a present time (t) based on a profile of the temperature ($T_{in}$) of the wheel bearing in a past time interval ($t-\Delta t_b$, t) in relation to the present time (t), wherein the method for predicting includes determining; a correction value ($\Delta T_p$) as a function of a change in at least one driving state condition ($\Delta v_{train}$) and of a change in a temperature ($\Delta T_b$) of the wheel bearing within the past time interval ($t-\Delta t_b$, t); and obtaining the predicted temperature ($T_{in,p}$) of the wheel bearing from the sum of the temperature ($T_{in}$) of the wheel bearing at the present time (t) and the correction value ($\Delta T_p$), wherein the correction value ($\Delta T_p$) is calculated from a product of a factor (c), which represents a change in the at least one driving state condition ($\Delta v_{train}$) within the past time interval ($t-\Delta t_b$, t) and a change in the temperature ($\Delta T_b$) of the wheel bearing within the past time interval ($t-\Delta t_b$, t), wherein the factor (c):
a) is equal to a predefined value if the change in the at least one driving state condition ($\Delta v_{train}$) within the past time interval ($t-\Delta t_b$, t) is equal to zero,
b) is less than the predefined value if the change in the at least one driving state condition ($\Delta v_{train}$) within the past time interval ($t-\Delta t_b$, t) is positive, and
c) is greater than the predefined value if the change in the at least one driving state condition ($\Delta v_{train}$) within the past time interval ($t-\Delta t_b$, t) is negative, wherein the method of using the wheel bearing temperature comprises:
triggering supply of a signal for an applied state of at least one friction brake assigned to or adjacent to the wheel bearing when a predicted temperature ($T_{in,p}$) of the wheel bearing exceeds the temperature limiting value; and
triggering supply of a signal for a released state of the friction brake which is assigned to or adjacent to the wheel bearing when the predicted temperature ($T_{in,p}$) of the wheel bearing undershoots the temperature limiting value.

2. The method of claim 1, wherein the factor (c) is limited to a predefined value within a predefined interval ($c_{min}$, $c_{max}$).

3. The method of claim 1, wherein:
a) if the temperature ($T_{in}$) at the present time (t) or the predicted temperature ($T_{in,p}$) of the wheel bearing exceeds a predefined temperature threshold ($T_w$) for at least one predefined time interval ($\Delta t_w$), a warning signal (W) is generated, and
b) if the predicted temperature ($T_{in,p}$) of the wheel bearing exceeds a predefined temperature threshold ($T_A$) for at least one predefined time interval ($\Delta t_A$), an alarm signal (A) is generated.

4. The method of claim 1, wherein the temperature ($T_{in}$) of the wheel bearing is measured or estimated at the present time (t), and the temperature ($T_{in}$) of the wheel bearing is measured or estimated within the past time interval (t−$\Delta t_b$, t).

5. The method of claim 4, wherein the temperature ($T_{in}$) of the wheel bearing at the present time (t) is determined based on the temperature measured at a component that is different from the wheel bearing but has a thermally conductive direct or indirect connection to the wheel bearing.

6. The method of claim 5, wherein a wheel set bearing cover which at least partially covers the wheel bearing or a wheel set bearing housing is used as the component which is different from the wheel set bearing.

7. The method of claim 1, wherein the correction value ($\Delta T_p$) is limited to a maximum value ($\Delta T_{p,\,max}$).

8. A device for carrying out the method of claim 1, the device comprising:
 a temperature sensor that directly or indirectly measures the temperature of the wheel bearing; and
 a microcomputer, in which a computing model for predicting the temperature ($T_{in,p}$) of the wheel bearing is implemented.

9. The device of claim 8, wherein the vehicle is a rail vehicle and the wheel bearing is a wheel set bearing of a wheel set of the rail vehicle.

10. The device of claim 8, wherein the temperature sensor is combined with a speed sensor to form a combination sensor.

* * * * *